United States Patent
Liu

(10) Patent No.: US 12,087,050 B2
(45) Date of Patent: Sep. 10, 2024

(54) ITEM CLASSIFICATION SYSTEM, DEVICE AND METHOD THEREFOR

(71) Applicant: SITA Information Networking Computing UK Limited, Middlesex (GB)

(72) Inventor: Adrian Sisum Liu, Middlesex (GB)

(73) Assignee: SITA Information Networking Computing UK Limited (GB)

( * ) Notice: Subject to any disclaimer, the term of this patent is extended or adjusted under 35 U.S.C. 154(b) by 244 days.

(21) Appl. No.: 17/593,700

(22) PCT Filed: Mar. 26, 2020

(86) PCT No.: PCT/EP2020/058548
§ 371 (c)(1),
(2) Date: Sep. 23, 2021

(87) PCT Pub. No.: WO2020/193700
PCT Pub. Date: Oct. 1, 2020

(65) Prior Publication Data
US 2022/0139067 A1   May 5, 2022

(51) Int. Cl.
*G06F 3/01* (2006.01)
*G06N 7/01* (2023.01)
(Continued)

(52) U.S. Cl.
CPC .............. *G06V 20/10* (2022.01); *G06N 7/01* (2023.01); *G06N 20/20* (2019.01); *G06V 10/56* (2022.01);
(Continued)

(58) Field of Classification Search
CPC ........... G06T 7/248; G06T 7/70; G06T 15/04; G06V 10/36; G01T 15/20; G06Q 30/0643; G06F 3/04815
See application file for complete search history.

(56) References Cited

U.S. PATENT DOCUMENTS 5,970,239 A   10/1999   Bahl et al.
7,020,593 B2   3/2006   Hong et al.
(Continued)

FOREIGN PATENT DOCUMENTS

CN   101871768 A   5/2010
EP   3327616 A1   5/2018
(Continued)

OTHER PUBLICATIONS

International Search Report & Written Opinion issued in International Application No. PCT/EP2020/058548 dated Jul. 20, 2020; 14 pages.
(Continued)

*Primary Examiner* — Phuoc H Doan
(74) *Attorney, Agent, or Firm* — Morris, Manning & Martin, LLP; Adam J. Thompson, Esq.; Daniel E. Sineway, Esq.

(57) ABSTRACT

An image processing system for categorising the colour of an item is disclosed. The system comprises processing means configured to: process an image of an item to extract a portion of the image where the item is located; determine a first average colour value of a plurality of colour values associated with the portion of the image where the item is located; map the average colour value to one of a plurality of predetermined colour definitions based on a plurality of colour ranges associated with each colour definition; and categorise the colour of the item according to the mapping.

20 Claims, 10 Drawing Sheets

(51) Int. Cl.
  *G06N 20/20* (2019.01)
  *G06V 10/56* (2022.01)
  *G06V 10/762* (2022.01)
  *G06V 10/764* (2022.01)
  *G06V 10/774* (2022.01)
  *G06V 10/80* (2022.01)
  *G06V 10/82* (2022.01)
  *G06V 20/10* (2022.01)

(52) U.S. Cl.
  CPC .......... *G06V 10/762* (2022.01); *G06V 10/763* (2022.01); *G06V 10/764* (2022.01); *G06V 10/774* (2022.01); *G06V 10/809* (2022.01); *G06V 10/82* (2022.01)

(56) References Cited

U.S. PATENT DOCUMENTS

| | | | |
|---|---|---|---|
| 7,047,486 | B1 | 5/2006 | Nagao |
| 7,107,254 | B1 | 9/2006 | Dumais et al. |
| 7,925,645 | B2 | 4/2011 | Zhao et al. |
| 9,031,897 | B2 | 5/2015 | Marcheret |
| 9,152,694 | B1 | 10/2015 | Padidar et al. |
| 11,222,623 | B2 | 1/2022 | Wang et al. |
| 2006/0074830 | A1 | 4/2006 | Mojsilovic |
| 2008/0082426 | A1* | 4/2008 | Gokturk ............. G06Q 30/0623 707/E17.014 |
| 2009/0148039 | A1 | 6/2009 | Chen et al. |
| 2013/0044944 | A1 | 2/2013 | Wang et al. |
| 2018/0097826 | A1 | 4/2018 | Luan et al. |
| 2018/0137456 | A1 | 5/2018 | Fan et al. |
| 2020/0265341 | A1 | 8/2020 | Bhatt et al. |

FOREIGN PATENT DOCUMENTS

| | | | |
|---|---|---|---|
| WO | 20170134519 | A1 | 8/2017 |
| WO | 20200193699 | A1 | 10/2020 |
| WO | 20200193700 | A1 | 10/2020 |

OTHER PUBLICATIONS

Grana et al: "Class-based Color Bag of Words for Fashion Retrieval," 2012 IEEE International Conference on Multimedia and Expo, IEEE Computer Society 978-0-7695-4711, pp. 444-449 (6 pages).

Liu, et al: "A survey of content-based image retrieval with high-level semantics," ScienceDirect: Pattern Recognition 40 (2007) 262-282; (21 pages).

Wahyono, et al., "Body part boosting model for carried baggage detection and classification," Neurocomputing 228 (2017) 106-118; (14 pages).

Wang, et al., "On Branded Handbag Recognition," IEEE Transactions on Multimedia, vol. 18, No. 9, Sep. 2016; (14 pages).

Jiaramaneepinit et al., "Application of Neural Networks for Vehicle Classifiers: Extreme Learning Machine Approach," 2018 15th International Conference on Electrical Engineering/Electronics, Computer, Telecommunications and Information Technology; 2018 IEEE, pp. 241-244 (4 pages).

Extended European Search Report for European Application No. 19218330.9, mailed Jul. 31, 2020, 13 Pages.

International Preliminary Report on Patentability for International Application No. PCT/EP2020/058543, mailed Oct. 7, 2021, 12 Pages.

International Preliminary Report on Patentability for International Application No. PCT/EP2020/058548, mailed Oct. 7, 2021, 11 Pages.

International Search Report and Written Opinion for International Application No. PCT/EP2020/058543, mailed Jun. 24, 2020, 14 Pages.

Koini et al., ES2243174T3 Procedure and device for automatic transport, classification and loading of baggage.

Non-Final Office Action for U.S. Appl. No. 17/441,880, mailed Nov. 9, 2023, 18 Pages.

Notice of Allowance for U.S. Appl. No. 17/441,880, mailed Apr. 22, 2024, 9 Pages.

Notice of Allowance for U.S. Appl. No. 17/441,880, mailed May 14, 2024, 6 Pages.

* cited by examiner

ITEM CLASSIFICATION SYSTEM, DEVICE AND METHOD THEREFOR

CROSS REFERENCE TO RELATED APPLICATIONS

This application is a national phase application of, and claims benefit of and priority to International Application No. PCT/EP2020/058548, filed Mar. 26, 2020, entitled "ITEM CLASSIFICATION SYSTEM, DEVICE AND METHOD THEREFOR," which claims priority to European Application No. 19218330.9, filed Dec. 19, 2019, entitled "ITEM CLASSIFICATION SYSTEM, DEVICE AND METHOD THEREFOR," and Great Britain Application No. 1904185.4, filed Mar. 26, 2019, entitled "ITEM CLASSIFICATION SYSTEM, DEVICE AND METHOD THEREFOR," the disclosures of which are incorporated herein by reference as if set forth herein in their entireties.

FIELD OF THE INVENTION

This invention relates to item classification or recognition methods and systems. Further, this invention relates to image processing methods and system. It is particularly, but not exclusively, concerned with baggage classification and handling methods and systems, for example operating at airports, seaports, train stations, other transportation hubs or travel termini.

BACKGROUND OF THE INVENTION

Baggage performance has become very high priority in the majority of airlines. The Air Transport Industry transports some 2.25 billion bags annually. While 98% of all bags reach their destination at the same time as the owner, the 2% mishandled bags have been receiving increasingly negative press coverage and passenger complaints are on the rise.

Bags that are mishandled, particularly if they have lost their tags, are often very difficult to identify. This is because a passenger's description of their bag is subjective, and therefore matching a particular description to a bag is very difficult indeed and sometimes impossible. This is particularly the case in the aviation industry where a very large number of bags are transported annually. This issue is compounded by potential language difficulties.

Although there exists a standardized list of IATA™ bag categories, the current baggage mishandling process suffers from a number of problems:
  It is a labour-intensive labelling process by examining each bag
  If a bag is not clearly one colour or another, the labelling may well not be consistent
  Both human error and disagreement may impact how a bag is labelled and recorded
  Staff must be trained in understanding the baggage categories Further, conventional colour determination algorithms work based on a distance function which determines a distance between two points A, B in a 3-d colour space such as HSV or RGB. According to this scheme, unknown colours are categorised according whether known colours defined by the points A or B in a 3D colour space are closest to the unknown colour in the 3D colour space.

A problem with this approach is that the closest colour in terms of the distance function is not necessarily the correct predetermined colour. This due to fact that human colour perception varies between individuals. For example, one person may categorise an orange colour as yellow.

To solve this problem, a mapping scheme is performed which categorises bag colours according to predetermined colour types. The colour of a bag is determined by mapping a bag colour to one of a plurality of different predetermined colours or labels according to a colour definition table.

SUMMARY OF THE INVENTION

Embodiments of the invention seek to address these problems by using artificial intelligence to classify or/and identify a bag or bags based on a single image associated with a bag. This may be performed at check-in, or subsequent to check-in using a computer or server or mobile telephone or other portable computing device. The image is then processed, noting what the probable bag properties are, according to the classification, usually with an associated degree of certainty. This may be performed for each bag processed at an airport. These categories may then be recorded in a database and processed using a baggage reconciliation program, or displayed, to assist in baggage recovery.

According to some aspects, an item classification system for use in an item handling system. The classification system comprises a processing means configured to process an image of an item to determine, based on a first model, one or more predetermined first item types, each first item type defined by one or more first item characteristics, process the image to determine, based on a second model (103), one or more predetermined second item types, each second item type defined by one or more second item characteristics; and classify the item according to each first item type and each second item type. Preferably, each item is further classified according to the probability associated with each first item type and the probability associated with each second item type.

The invention is defined in the appended claims to which reference should now be made.

One advantage of being able to classify an item using only a single image is because existing systems do not need to be modified to capture multiple images. Therefore, embodiments of the invention avoid additional infrastructure such as multiple cameras being needed to take different views of an item being classified.

Currently, there are no existing automated methods for performing such a procedure.

Accordingly, embodiments of the invention may using a one or more computer vision models to identify various different aspects of an item or bag, such as type, material, colour, or external element properties. Preferably three models are used. This has approximately a 2% performance improvement compared to using one or two models.

Even more preferably the outputs or classifications from 3 models are combined. This has approximately a 15% performance improvement compared to not combining the outputs of 3 models. Preferably, embodiments of the invention may comprise resizing of an input image to improve performance speed.

Embodiments of the invention use machine learning techniques which use a dataset of bag images to generate classifications for each image based on one or more categories. In addition, embodiments of the invention may comprise processing using a rules engine, image manipulation techniques, such as white-balancing.

Embodiments of the invention may generate estimated probabilities for each of the possible bag types which a bag belongs to, including the probability that a bag has a label and location of the labels as well as other groups of characteristics of the bag. These may be stored in a database.

Compared to existing item recognitions systems, embodiments of the invention have the advantage that:

Automation results in a faster process than a person examining each bag by hand;

The marginal cost to analyse each bag is be lower for a computerized system;

The images are stored to iterate on the process, resulting in accuracy improvements over time;

It is easier to integrate embodiments of the invention with electronic systems; and Embodiments of the invention have the advantage that they provide objective, rather than subjective, assessments of colour.

According to a further aspect of the present invention, a colour determination process is disclosed. The colour determination process may be performed alternatively or in addition to item classification or/and identification.

BRIEF DESCRIPTION OF THE DRAWINGS

An embodiment of the invention will now be described, by way of example only, and with reference to the accompanying drawings, in which.

DETAILED DESCRIPTION

The following exemplary description is based on a system, apparatus, and method for use in the aviation industry. However, it will be appreciated that the invention may find application outside the aviation industry, particularly in other transportation industries, or delivery industries where items are transported between locations.

The following embodiments described may be implemented using a Python programming language using for example an OpenCV library. However, this is exemplary and other programming languages known to the skilled person may be used such as JAVA.

System Operation

Figure 2:
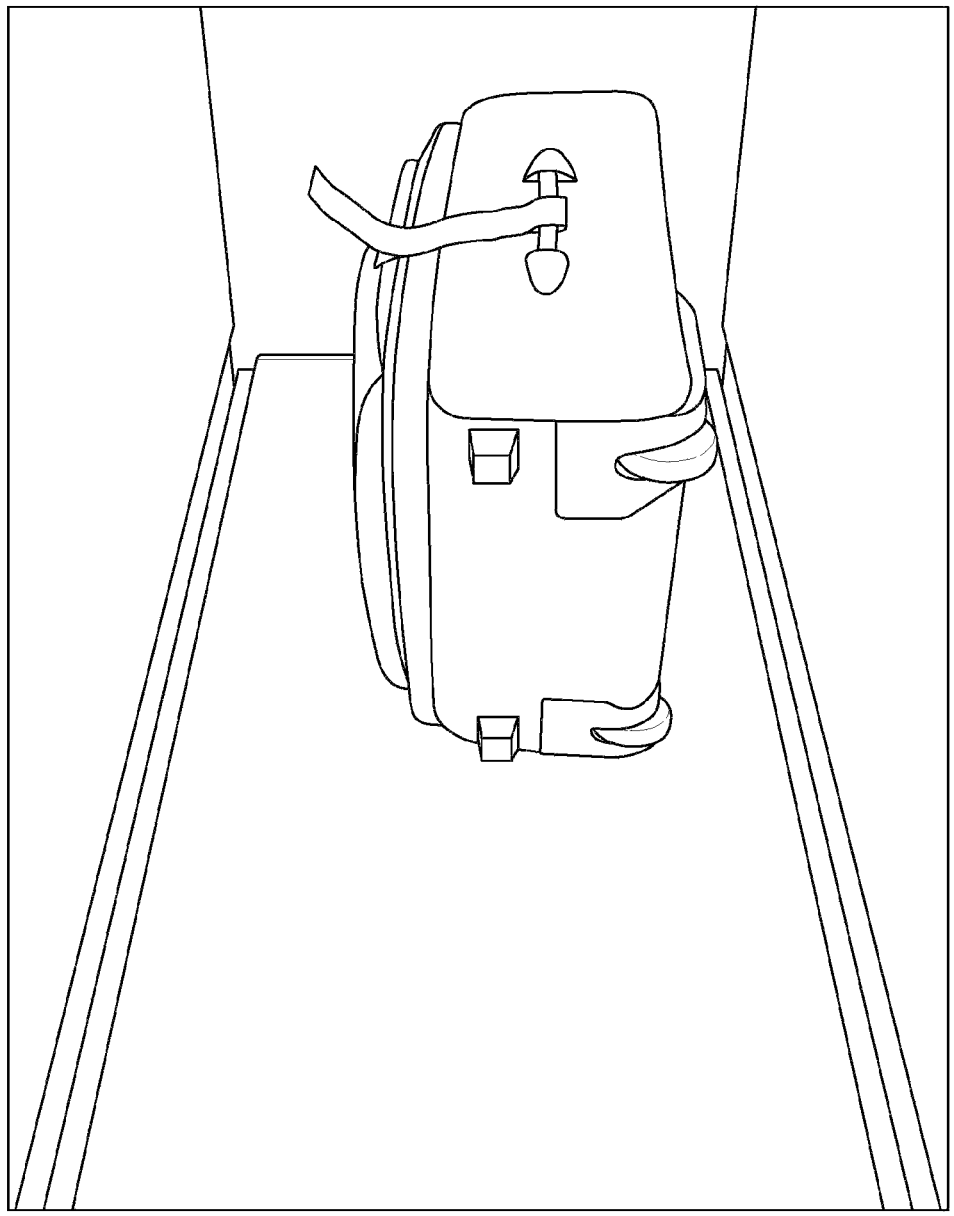
FIG. 2 is an exemplary image of training data used to train the neural network.
Figure 3:
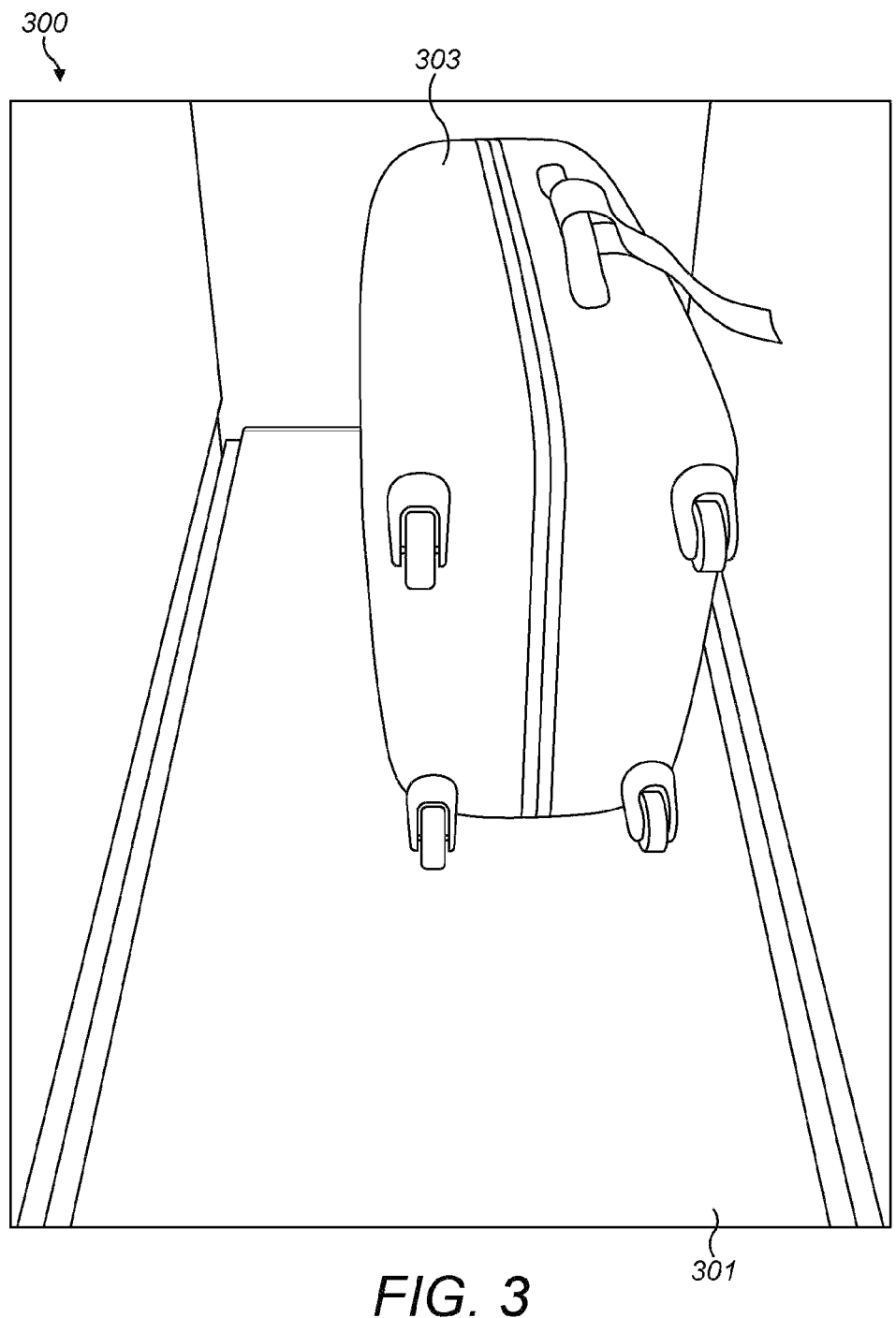
FIG. 3 is an exemplary image of a passenger's bag captured by a camera located at a bag drop desk.
Figure 4:
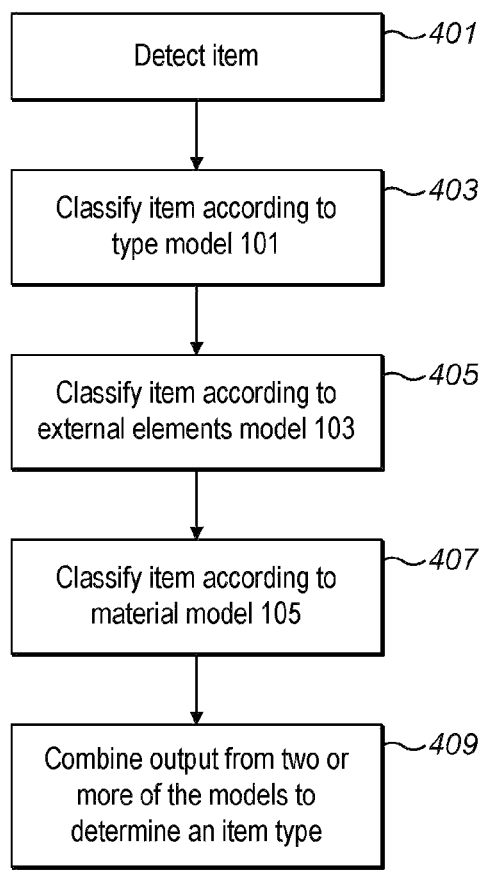
FIG. 4 is a flow diagram showing the main steps performed by an embodiment of the invention.

An embodiment of the invention will now be described referring to the functional component diagram of FIG. 1, also referring to FIGS. 2 and 3 as well as the flow chart of FIG. 4.

Usually, the messaging or communication between different functional components is performed using the XML data format and programing language. However, this is exemplary, and other programming languages or data formats may be used, such as REST\JSON API calls. These may be communicated over HTTPS using wired or wireless communications protocols which will be known to the skilled person. JSON calls may also be advantageously used.

Usually, the different functional components may communicate with each other, using wired or wireless communication protocols which will be known to the skilled person. The protocols may transmit service calls, and hence data or information between these components. Data within the calls is usually in the form of an alpha-numeric string which is communicated using wired or wireless communication protocols.

The system may comprise any one or more of 5 different models. Each of the models may run on a separate computer processor or server, although it will be appreciated that embodiments of the invention may in principle run on a single computer or server. Usually, a wired or wireless communications network is used. This may communicatively couple one or more of the functional components shown in FIG. 1 together to allow data exchange between the component(s). It may also be used to receive an image of a bag captured by a camera or other recording means 109. Usually, the camera or recording means is positioned on or within a bag drop kiosk or desk, or a self-service bag drop machine at an airport. It will be appreciated that the image comprises sample values or pixels.

It will be also appreciated that many such cameras or recording means may be coupled to a central computer or server which classifies each bag, as will be described in further detail below.

In all cases, wired or wireless communications protocols may be used to exchange information between each of the functional components.

The computer or server comprises a neural network. Such neural networks are well known to the skilled person and comprise a plurality of interconnected nodes. This may be provided a web-service cloud server. Usually, the nodes are arranged in a plurality of layers L1, L2, . . . LN which form a backbone neural network. For more specialised image classification, a plurality of further layers are coupled to the backbone neural network and these layers may perform classification of an item or regression such as the function of determining a bounding box which defines a region or area within an image which encloses the item or bag.

Figure 1:
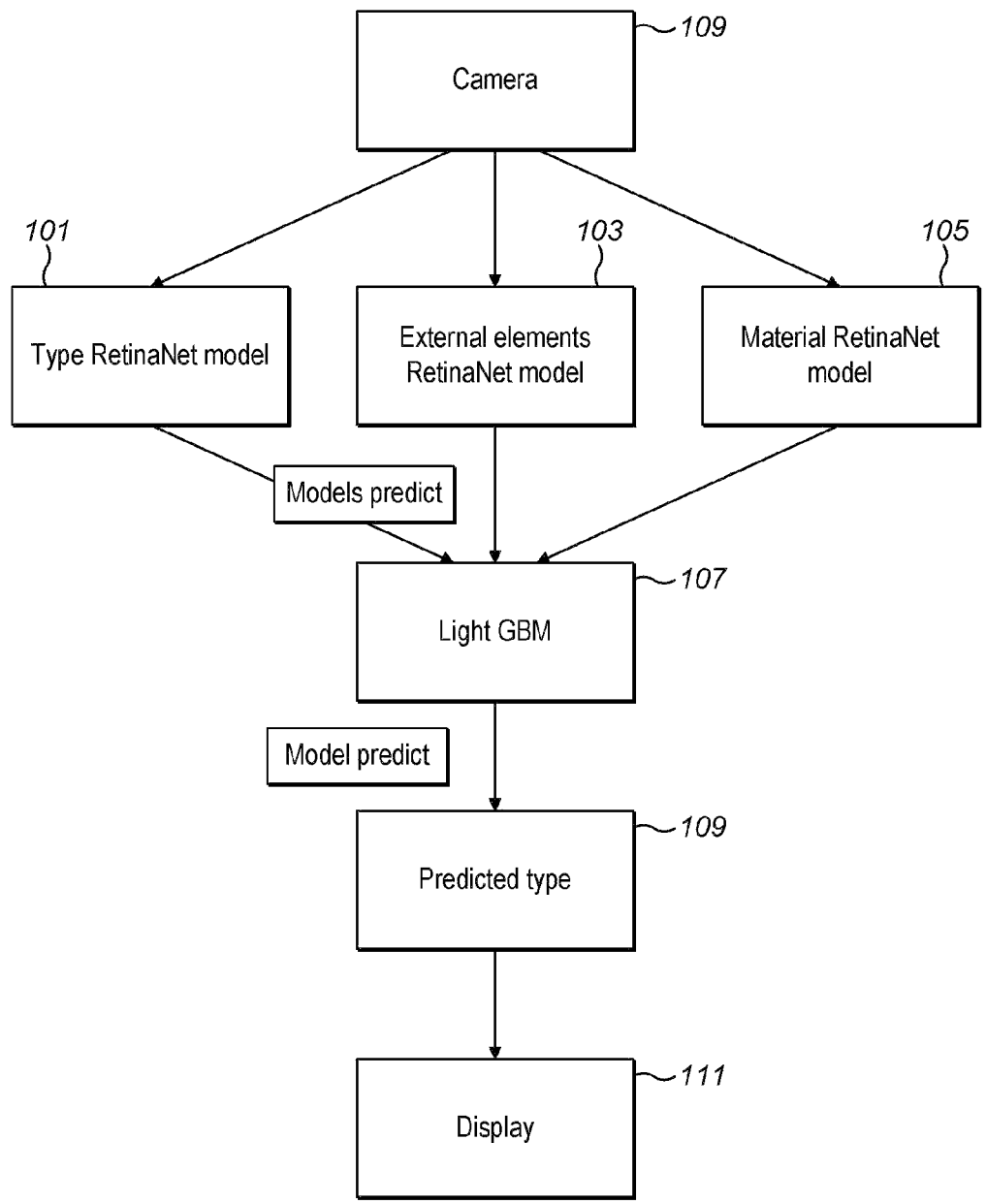
FIG. 1 is a schematic diagram showing the main functional components according to an embodiment of the invention.

As shown in FIG. 1 of the drawings one or more models 101, 103, 105, 107, 109 may be used to classify or/and identify an item of baggage.

Each model may be trained using a convolutional neural network with a plurality of nodes.

Each node has an associated weight. The neural network usually has one or more nodes forming an input layer and one or more nodes forming an output layer. Accordingly, the model may be defined by the neural network architecture with parameters defined by the weights.

Thus, it will be appreciated that neural network is usually trained. However, training of neural networks is well known to the skilled person, and therefore will not be described in further detail.

Nevertheless, the inventor has found that a training data set of 9335 images of bags with a test size of 4001 was found to provide acceptable results when the trained neural network was used to classify bag types. The test size is the number of images used to validate the result. One specific example of a neural network is the RetinaNet network neural network having 50 layers (ResNet50) forming a backbone neural network, although more or less layers may be used and it will be appreciated that other backbone neural networks may be used instead of the ResNet50 neural network. RetinaNet is an implementation of loss function for manually tuned neural network architectures for the object detection and segmentation, and will be known to the skilled person. Thus, each of models 101, 103, 105, 107, 109 may be implemented using RetinaNet.

The following machine learning algorithms may also be used to implement embodiments of the invention. This shows accuracy metrics of different machine learning algorithms.

| Machine Learning Algorithm | Accuracy |
|---|---|
| LightGBM | 0.863 |
| Random Forest | 0.858 |
| K-Nearest Neighbours | 0.798 |
| SVM Linear Kernel | 0.861 |
| SVM Polynomial Kernel | 0.861 |

Usually, the neural network is remotely accessed by wired or wireless communication protocols which will be known to the skilled person.

Each image in the training data set has an associated type definition and/or material definition and a bounding box defining the location of the bag within the image was defined. Thus, it will be appreciated that the bounding box may represent a possible region of interest in the image. Usually, the bounding box is defined by the coordinates of a rectangular border that encloses all or a portion of an image. An external element definition was also associated with each image.

The type model 101 is trained to classify a bag according to a number of predetermined categories. The model 101 is trained using the training data set of images to determine a bag type. Separate model 103 is trained using the training data set of images to determine characteristics of the bag external elements. Material model 105 is trained using the training data set of images to determine a material type of the bag. An exemplary image included in the training data set is shown in FIG. 2 of the drawings. The training data comprises an image of a bag and associated CSV values defining x and y coordinates of the bounding box. The CSV values associated with the image of FIG. 2 are shown in table

TABLE 1

The bounding boxes of each image are defined by the bottom left x coordinate (Blx), the bottom right y coordinate (Bly), the top right x (Trx) coordinate and the top right y (Try) coordinate. Each bounding box has an associated label and image file name. Bounding boxes are explained in further detail below.

| File name | Coordinates | | | | Label |
|---|---|---|---|---|---|
| | Blx | Bly | Trx | Try | |
| /mnt/dump/BagImages/images/1004.png | 154 | 38 | 364 | 412 | D |
| /mnt/dump/BagImages/images/1004.png | 154 | 38 | 364 | 412 | T22D |
| /mnt/dump/BagImages/images/1004.png | 154 | 38 | 364 | 412 | BK |
| /mnt/dump/BagImages/images/1004.png | 307 | 218 | 360 | 259 | wheel |
| /mnt/dump/BagImages/images/1004.png | 294 | 361 | 337 | 401 | wheel |
| /mnt/dump/BagImages/images/1004.png | 225 | 57 | 248 | 89 | combo_lock |
| /mnt/dump/BagImages/images/1004.png | 196 | 57 | 225 | 112 | zip_chain |
| /mnt/dump/BagImages/images/1004.png | 183 | 140 | 210 | 381 | zip_chain |

Once one or more of the models have been trained using the training data, embodiments of the invention use one or more of the trained models to detect for material, type and external elements of the bag. The type model 101 categorises an image of a bag according to one or more of the following predetermined categories shown in table 2:

TABLE 2

Type Precisions of different baggage classifications determined according to an embodiment of the invention.

| Label | Name | Precision | N |
|---|---|---|---|
| T01 | Horizontal design Hard Shell | 0.000 | 6 |
| T02 | Upright design | 0.889 | 476 |
| T03 | Horizontal design suitcase Non-expandable | 0.000 | 3 |
| T05 | Horizontal design suitcase Expandable | 0.000 | 5 |
| T09 | Plastic/Laundry Bag | 0.000 | 3 |
| T10 | Box | 0.939 | 33 |
| T12 | Storage Container | 0.000 | 5 |
| T20 | Garment Bag/Suit Carrier | 0.000 | 5 |
| T22 | Upright design, soft material | 0.000 | 26 |
| T22D | Upright design, combined hard and soft material | 0.944 | 748 |
| T22R | Upright design, hard material | 0.932 | 2062 |
| T25 | Duffel/Sport Bag | 0.379 | 29 |
| T26 | Lap Top/Overnight Bag | 0.357 | 42 |
| T27 | Expandable upright | 0.397 | 267 |
| T28 | Matted woven bag | 0.000 | 2 |
| T29 | Backpack/Rucksack | 0.083 | 12 |

In addition to the types identified in Table 2, the following additional bag categories may be defined. A label of Type 23 indicates that the bag is a horizontal design suitcase. A label of Type 6 indicates that the bag is a brief case. A label of Type 7 indicates that the bag is a document case. A label of Type 8 indicates that the bag is a military style bag. However, currently, there are no bag types indicated by the labels Type 4, Type 11, Type 13-19, Type 21, or Type 24.

In Table 2, N defines the number of predictions for each bag category or name, for example "Upright design", and the label is a standard labelling convention used in the aviation industry. Preferably, a filtering process may be used to remove very dark images based on an average brightness of pixels associated with the image.

The external elements model 103 categorises an image of a bag according to one or more of the following predetermined categories shown in table 3:

TABLE 3

Different external elements classifications and precisions with score threshold = 0.2. If the prediction gives a probability of less than 0.2, then the data is not included. The buckle and zip categorisations may advantageously provide for improved item classification, which will be explained in further detail below.

| Name | Recall | N_act | Precision | N_pred |
|---|---|---|---|---|
| buckle | 0.300 | 40 | 0.203 | 59 |
| combo_lock | 0.921 | 1004 | 0.814 | 1137 |
| retractable_handle | 0.943 | 421 | 0.827 | 480 |
| straps_to_close | 0.650 | 197 | 0.621 | 206 |
| wheel | 0.988 | 1549 | 0.932 | 1642 |
| zip | 0.910 | 1539 | 0.914 | 1531 |

The material model 105 categorises an image of a bag according to one or more of the following predetermined categories shown in table 4:

TABLE 4

Different material classifications and precisions.

| label | name | precision | N |
|---|---|---|---|
| D | Dual Soft/Hard | 0.816 | 437 |
| L | Leather | 0.000 | 3 |
| M | Metal | 0.000 | 3 |
| R | Rigid (Hard) | 0.932 | 1442 |
| T | Tweed | 0.444 | 57 |

Baggage Classification on Bag Drop

An exemplary bag classification process will now be described with reference to FIGS. 1, 3, 4, and 5 of the drawings.

A passenger arrives at a bag drop kiosk and deposits their bag on the belt 301, 501. The camera 109 or belt 301 or 501 or both detect, at step 401, a that a bag 303, 503 has been placed on the belt. This may be performed using image processing techniques by detecting changes in successive images in a sequence of images or by providing a weight sensor coupled to the belt. An image or picture of the bag 300, 500 is then taken using the camera 109 in response to detection of the bag.

In either case, the piece of baggage is detected, and this may be used as a trigger to start the bag classification process. Alternatively, the image may be stored in a database and the classification may be performed after image capture and storage.

At step 403, one or more of the models 101, 103, 105, process the image 300, 500 of the bag captured by the image capture means or camera 109. In principle, the models may operate in series or parallel, but parallel processing is preferable.

The results of the processing of the image 300, 500 are shown in tables 4, 5 and 6.

TABLE 4

An exemplary RetinaNet Type model output. In this example, the model 101 has determined that the bag may belong to three possible different categories of bags: T02 is an upright design with no zip, T22R is an upright design with hard material with a zip and T27 is an expandable upright design.

```
>>> models.type_model.image_predict(img).iloc[:,:2]
```

| | score | label |
|---|---|---|
| 0 | 0.604188 | T02 |
| 0 | 0.471872 | T22R |
| 0 | 0.222365 | T27 |

Under certain circumstances, model 101 may correctly classify a bag as the bag type having an associated score or probability which is the highest, depending upon the image and the position which the bag is placed on the belt.

However, because of poor image quality or the position in which a bag is placed on the belt, the model 101 may not correctly classify the bag.

Therefore, it is advantageous that the external elements model 103 also operates on the image 300 or 500. This may be done sequentially or in parallel to the processing performed by model 101.

TABLE 5

An exemplary RetinaNet External model output. The combo lock and zip slider, and wheel external elements categorisations or classifications appear more than once. This is because the model found two of the features or characteristics.

```
>>> models.external_model.image_predict(img).iloc[:,:2]
```

| | score | label |
|---|---|---|
| 0 | 0.568917 | combo_lock |
| 0 | 0.447264 | combo_lock |
| 0 | 0.381501 | zip_slider |
| 0 | 0.359150 | wheel |
| 0 | 0.338619 | retractable_handle |
| 0 | 0.301219 | combo_lock |
| 0 | 0.255498 | buckle |
| 0 | 0.254586 | zip_slider |
| 0 | 0.216772 | wheel |

Under certain circumstances, the external elements model 103 may also correctly classify a bag as the bag type having an associated score or probability which is the highest, depending upon the image and the position which the bag is placed on the belt.

However, because of poor image quality or the position in which a bag is placed on the belt, model 103 may not correctly classify the bag.

Therefore, it is advantageous that the material model 105 also operates on the image 300 or 500. This may be done sequentially or in parallel to the processing performed by models 101 and 103.

TABLE 6

An exemplary RetinaNet Material model output.

```
>>> models.material_model.image_predict(img).iloc[:,:2]
```

| | score | label |
|---|---|---|
| 0 | 0.983209 | R |

In the example shown in table 6, the model 105 has determined a single rigid bag type.

As shown in FIG. 1 of the drawings, the outputs from each model 101, 103, 105 shown in the specific examples above may be combined by weighting the classifications determined by model 101 based on the results output from model 103 or/and 105.

TABLE 7

The LightGBM model 107 output. R means that the bag is rigid

```
>>> models.predict(img)
(          label                score
 0          T02              0.297951
 1          T22R             0.475171
 2          T27              0.212052
```

Thus, as will be seen from table 7, the type T22R has been more heavily weighted, and therefore the bag is correctly classified in this example as type T22R, rather than the type T02 determined by model 101.

Thus, it will be appreciated that each of the models 101, 103, and 105 are separately trained based on training data according to different groups of characteristics. This is in contrast to conventional neural network methods which learn multiple labels for a single image using a single neural network. Thus, embodiments of the invention train using a plurality of different labels. The external elements model is separately trained based on the appreciation that this does not require knowledge of other bag descriptions.

The light GBM model 107 may be trained using training data in order to weight the outputs from each of models 101, 103, 105 in order to correctly classify or categorise a bag.

Accordingly, it will be appreciated that embodiments of the invention are able to correctly determine a predetermined bag type with an increased probability.

This may have a 15% improvement in detection precision compared to using known image processing techniques such as conventional object detection and classification methods which simply train a convolutional neural network model with labels and bounding boxes for the type. This is based on the appreciation that some bag types are very similar. For example, the types for a hard-upright bag with a zip and a without a zip. Following the conventional method, in testing, most of the misclassifications have been from these similar types.

TABLE 8

Comparative performance analysis of the outputs of the Light GBM model 107 compared to the type model 101.

| Label name | Type precision using type model 101 | Precision using LightGBM model 107 | N |
|---|---|---|---|
| T01 | 0 | 0 | 6 |
| T02 | 0.761566 | 0.888655 | 476 |
| T03 | 0 | 0 | 3 |
| T05 | 0 | 0 | 5 |
| T09 | 0 | 0 | 3 |
| T10 | 0.538462 | 0.939394 | 33 |
| T12 | 0 | 0 | 5 |
| T20 | 0 | 0 | 5 |
| T22 | 0 | 0 | 26 |
| T22D | 0.701789 | 0.94385 | 748 |
| T22R | 0.789194 | 0.93162 | 2062 |
| T25 | 0.333333 | 0.37931 | 29 |
| T26 | 0.136364 | 0.357143 | 42 |
| T27 | 0.355828 | 0.397004 | 267 |
| T28 | 0 | 0 | 2 |
| T29 | 0 | 0.083333 | 12 |

Table 8 shows the results of the retina net model 101 performing alone, as well as the results of the of combining and weighting the outputs from each of the models 101, 103, and 105 generated using light GBM model 107. It will be seen For example, using type model 101 on its own, for 476 images, there is approximately a 76% probability that the type model has correctly determined 476 bags as Type 02—upright design. However, when the light GBM precision model combines or/and weights the outputs the possible bag types and associated probabilities from each of model 101, 103, and 105, the probability that the 476 bags have been correctly classified as Type 02—upright design increases to approximately 89%. This represents a significant performance improvement.

Thus, it will be appreciated that a model 107 may be trained using LightGBM with outputs from the Type model 101, External Elements model 103 and Material model 105 as categorical features. Having a description of the Material and which External Elements there are provides important context features which may improve accuracy.

The Material model 105 and Type RetinaNet model 101 may be trained using training techniques which will be known to the skilled person. However, for the external elements model, embodiments of the invention can include new labels not defined by the industry, such as zip chain, zip slider and buckle. These may be used as additional features for training of the LightGBM model 107.

Figure 5:
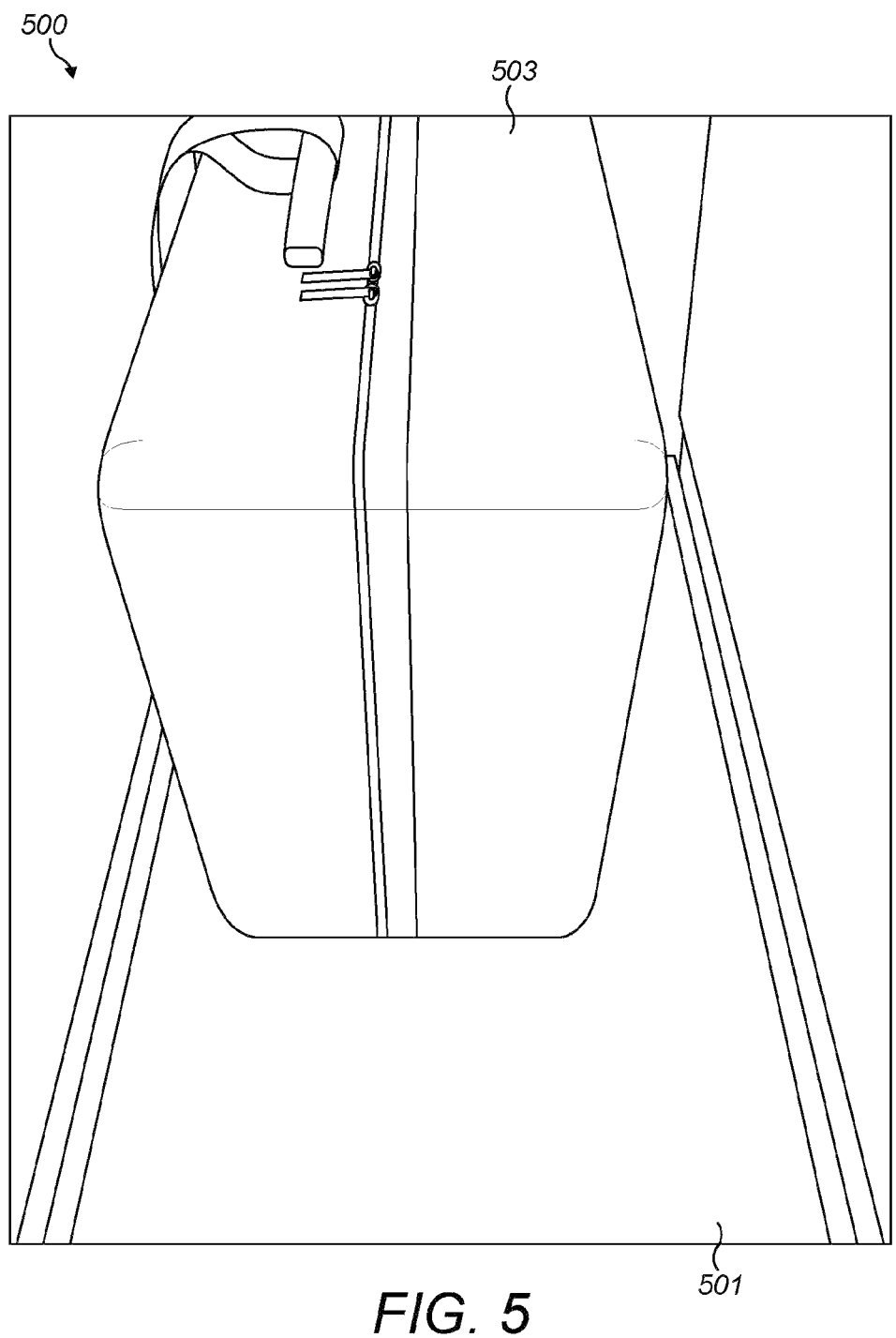
FIG. 5 is an exemplary further image of a passenger's bag captured by a camera located at a bag drop desk.

For example, with reference to FIG. 5 of the drawings, it will be appreciated that, possibly due to poor lighting, the RetinaNet 101 model was unable to determine correct class T22R Upright Design, Hard Material (with zip), and gives higher percentage to T02 Upright design (no zip). Using the RetinaNet External Elements model 103 which shows that zips are likely to be present and allows the LightGBM model 107 to reduce this percentage and correctly classify a bag 109.

Figure 9:
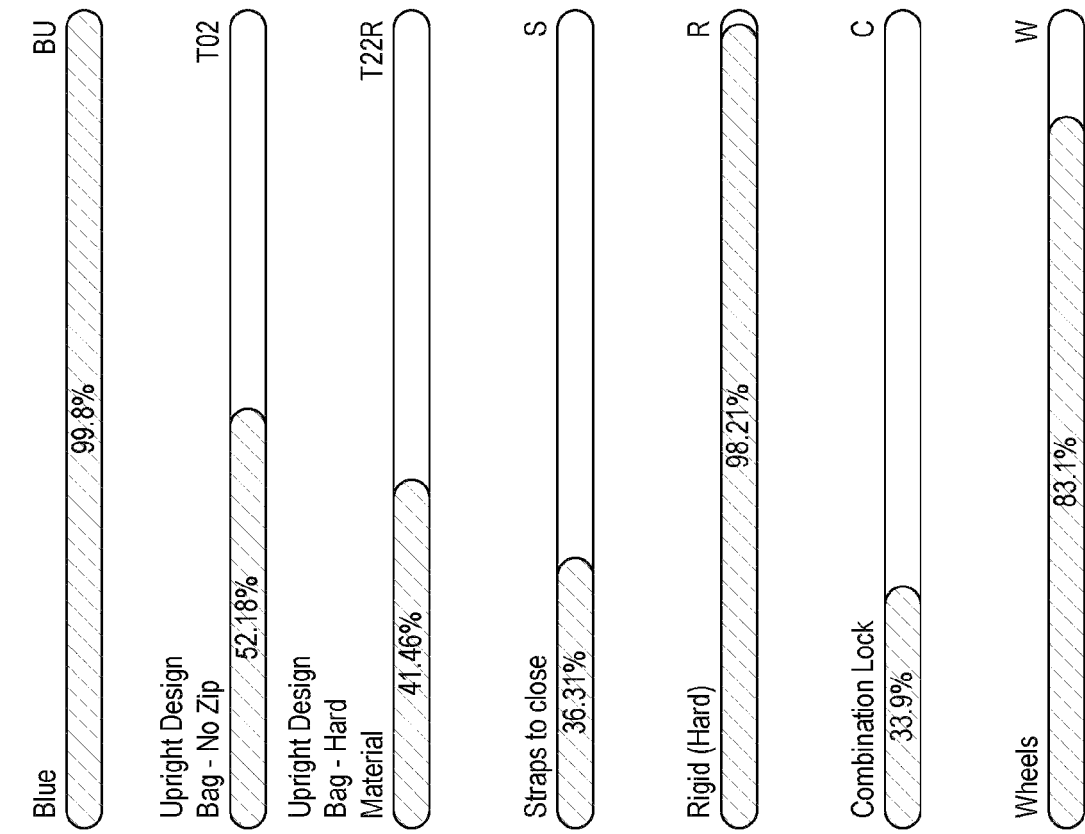
FIG. 9 shows an exemplary further image of a passenger's bag captured by a camera located at a bag drop desk which is displayed using a display, together with the determined item types, characteristics and associated probabilities.
Figure 9:
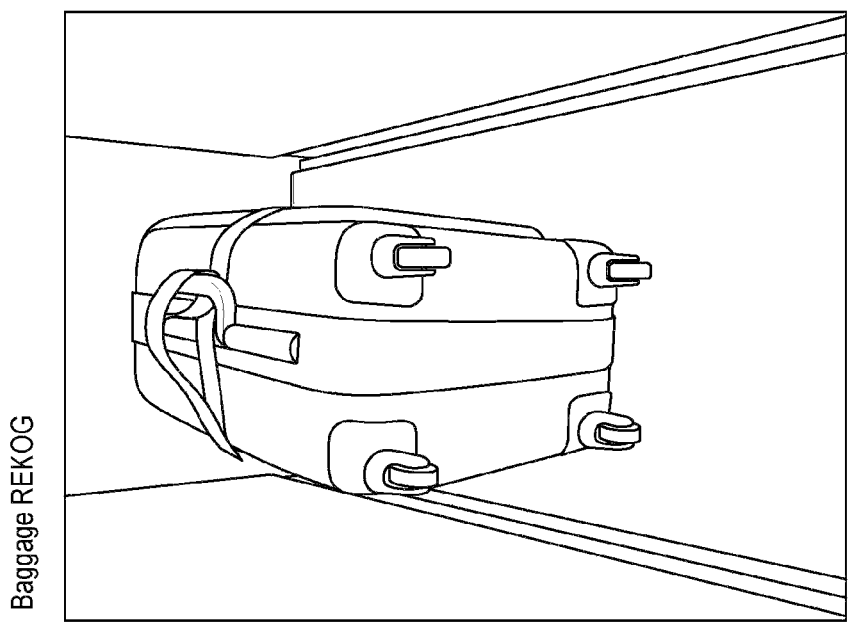

As shown in FIG. 9 the results of the classification or categorisation may be output to a User Interface, at step 709. This may be advantageously used by an agent for improved retrieval of a lost bag.

In addition, the item handling system and classification system may be configured in some implementations to process the item according to the determined item type. For example, bags which are identified as being unsuitable for processing along one baggage processing channel may be diverted along an alternative path based on the categorisation. For example, items classified according to label T29 as a Backpack/Rucksack usually include one or more shoulder straps. Such shoulder straps can easily become entangled in item processing equipment. Accordingly, items classified according to label T29 may be processed by a first item processing channel which is adapted to process such items. Other items not categorised according to label T29 may be processed by a second item processing channel which is not adapted to process such items. The item handling system may be configured to output a signal to a diverting or moving means such as pivotable arm including an actuator which diverts items along the first processing channel or second processing channel depending upon the determined item classification and thus the output signal.

Embodiments of the invention may be advantageously used to locate missing or lost items.

This may be performed by searching a data base or storage means for an item having characteristics corresponding to the determined classification of the item. Location data and data defining a time when an item was detected may also be stored in the database and associated with each item.

Thus, a processor may be configured to search a database for items having associated location data and data defining a time when the item was detected which is associated with the determined item classification.

Thus, it will be appreciated that when a bag or item is missing or lost, the processor may advantageously search a database for matching bags with the characteristics during a predetermined time period at predetermined location. This has the benefit that missing items may be more quickly located.

Determining the Colour of a Bag

Alternatively or in addition to classifying a bag type as previously described, an embodiment of the invention will now be described which classifies a region of an image according to a predetermined colour classification. Thus, it will be appreciated that the colour classification process described below may be combined with the previously described bag or item classification, in order to be able to more accurately identify or classify bags.

Colour classification may be performed by a colour mapping process according to a plurality of different colour definitions. These may be classified according to the hue, saturation and value (H, S and V) definitions of a plurality of different colour categorisations in which the different colours are defined according to the values defined in the Table 9.

TABLE 9

The H, S, and V definitions of a number of predetermined different colour classifications.

| Label | Colour | H | V | S |
|---|---|---|---|---|
| wt | white | 0 | 100 | 0 |
| bk | black | 0 | 0 | 0 |
| gy | grey | 0 | 35 | 0 |
| gy | grey | 0 | 67 | 0 |
| bu | blue | 203 | 41 | 77 |
| bu | blue | 206 | 88 | 55 |
| bu | blue | 187 | 45 | 94 |
| pu | purple | 270 | 53 | 50 |
| pu | purple | 300 | 47 | 54 |
| rd | red | 0 | 84 | 71 |
| rd | red | 343 | 92 | 34 |
| rd | red | 356 | 68 | 65 |
| yw | yellow | 53 | 100 | 72 |
| yw | yellow | 30 | 96 | 73 |
| yw | yellow | 40 | 99 | 68 |
| be | beige | 58 | 100 | 28 |
| be | beige | 36 | 91 | 35 |
| bn | brown | 44 | 37 | 43 |
| bn | brown | 30 | 29 | 33 |
| gn | green | 129 | 40 | 60 |
| gn | green | 66 | 85 | 69 |
| gn | green | 88 | 67 | 72 |
| bu1 | blue | 221 | 64 | 40 |
| bu2 | blue | 220 | 33 | 39 |
| bu3 | blue | 225 | 50 | 31 |

The values and labels bu1, bu2, and bu3 shown in bold are colour definitions which allow for a more precise colour determination of blue bags. The following describes how embodiments of the invention may uniquely map a bag colour to a single one of the plurality of different predetermined colour classifications shown in Table 9.

Embodiments of the invention use certain rules for ranges of HSV assigned to colour instead of a distance function.

This will be described referring to the functional component diagram of FIG. 6, the flow diagram of FIG. 7, and the colour tree diagram of FIG. 8.

A passenger arrives at a bag drop kiosk and deposits their bag on the belt 301, 501. The camera 109 or belt 301 or 501 or both detect, at step 701, that a bag 303, 503 has been placed on the belt. This may be performed using image processing techniques by detecting changes in successive images in a sequence of images or by providing a weight sensor coupled to the belt. An image or picture of the bag 300, 500 is then taken using the camera 109, 609.

In either case, the piece of baggage is detected, and this may be used as a trigger to start the colour classification process. Alternatively, the image may be stored in a database and the classification may be performed after image capture and storage.

Each model may output a class label, a score or probability and a bounding box for any object detected within the image input. As the type 101, 601, and Material Models 105, 605 are trained using bounding boxes around the whole bag, any prediction also outputs a predicted bounding box for a bag, as shown in the specific example of Table 1. Accordingly, the colour predict model may use the previously described and trained RetinaNet models for Type 101, 609 and Material 105, 605 in order to determine a bounding box around an item of baggage.

The colour prediction process may then use the bounding box with the highest score as an input into a grab cut function which performs foreground/background selection to extract an accurate cut out of a bag.

Alternatively, the colour prediction process may separately determine a bounding box for a bag within an image. This has the advantage that the colour prediction process can be applied without necessarily determining a bag type using the type model 101 or the bag material using the material model 105.

In either case, a foreground portion of an image including the bag is extracted using the portion of the image within the bounding box. This portion of the image is input into the grab-cut function at step 703. The grab-cut function is a well-known image processing technique which will be known to the skilled person, but however other techniques may be used. The grab-cut function is available at https://docs.opencv.org/3.4.2/d8/d83/tutorial_py_grabcut.html If the camera or image capture means generates an image according to an RGB colour space, then an average RGB colour value is then determined from the portion of the image containing the bag or in other words the portion of the image output from the grab-cut function, at step 705. Alternatively, the image may be defined according to an HSV colour space, in which case an average HSV colour value is determined from the portion of the image output from the grab-cut function, at step 705.

Optionally, the average colour determined at step 705 may be input into a random forest model 619. The average colour may be determined using a well-known function such as a median function, a mode function or a mean function. Embodiments of the invention preferably used a mean function to calculate the mean value of an array of elements. This may be calculated by summing the values of the array of elements and dividing the sum by the number of elements in the array.

Irrespective of the type of colour space used, a single average over a plurality of channels, such as three channels, of the colour space is determined. The determined single average over a plurality of colour space channels may then be used as information for random forest as a feature variable.

Average H, S, V values may also be calculated at this stage and then used in rules-based colour assignment for target variable in training data for the random forest.

Thus, it will be appreciated that the random forest model may learn from features different from the rules-based approach so as to not simply learn using a rules-based approach. This has the advantage that the colour classification algorithm is more accurately identify outlier cases such as the example of a black bag with a red ribbon.

Figure 6:
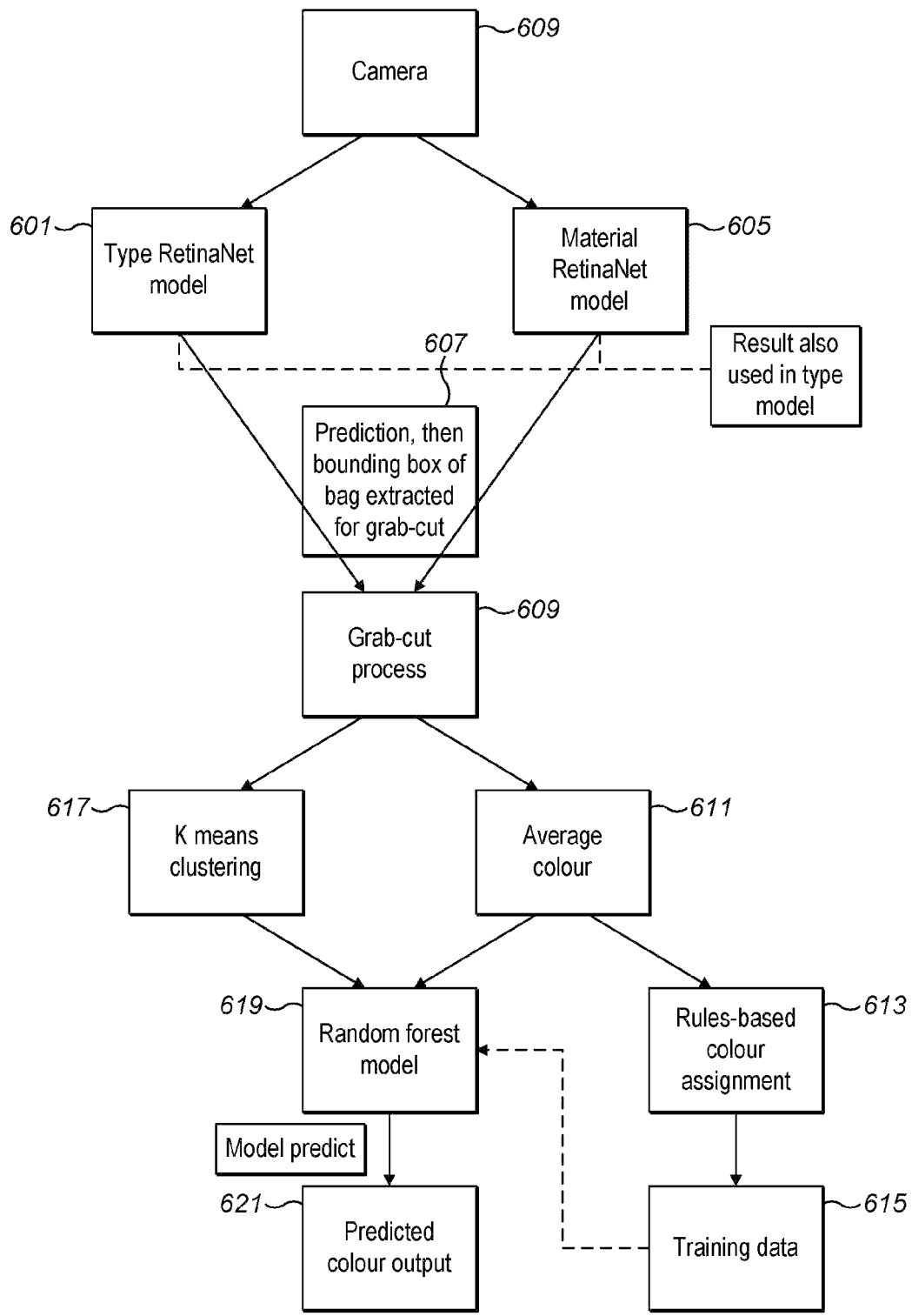
FIG. 6 is a schematic diagram showing the main functional components according to a further embodiment.
Figure 7:
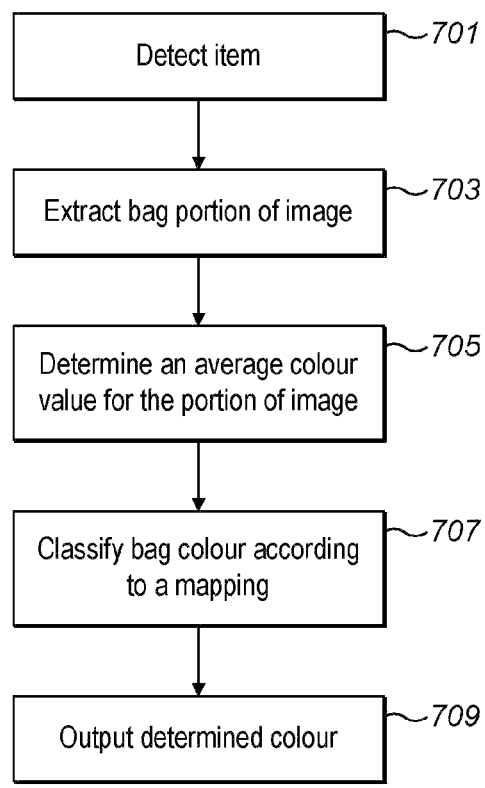
FIG. 7 is a flow diagram showing the main steps performed by a further embodiment of the invention.

Accordingly, it will be appreciated that with reference to FIG. 6 of the drawings, two different average colours of selected portions of the image may be determined.

Firstly, a single average (RGB) value may be determined for a portion of the image. This first average value may then be input into the random forest model. Second and further average values for the portion of the image may also be determined, for example average (H), average (S), and average (V) which are input into the rules based algorithm approach of FIGS. 7 and 8 of the drawings.

However, it will be appreciated that a single average RGB value and the averages of any one or more of H, S, V could advantageously be used in the Random Forest model.

Further, embodiments of the invention may omit the average (H), average (S), and average (V) values from the input to the Random Forest model because some embodiments of the invention already use these average H, S, V values in the rules based colour assessment approach. Omitting this input removes the possibility of the Random Forest model learning the rules based approach of FIG. 8.

Figure 8:
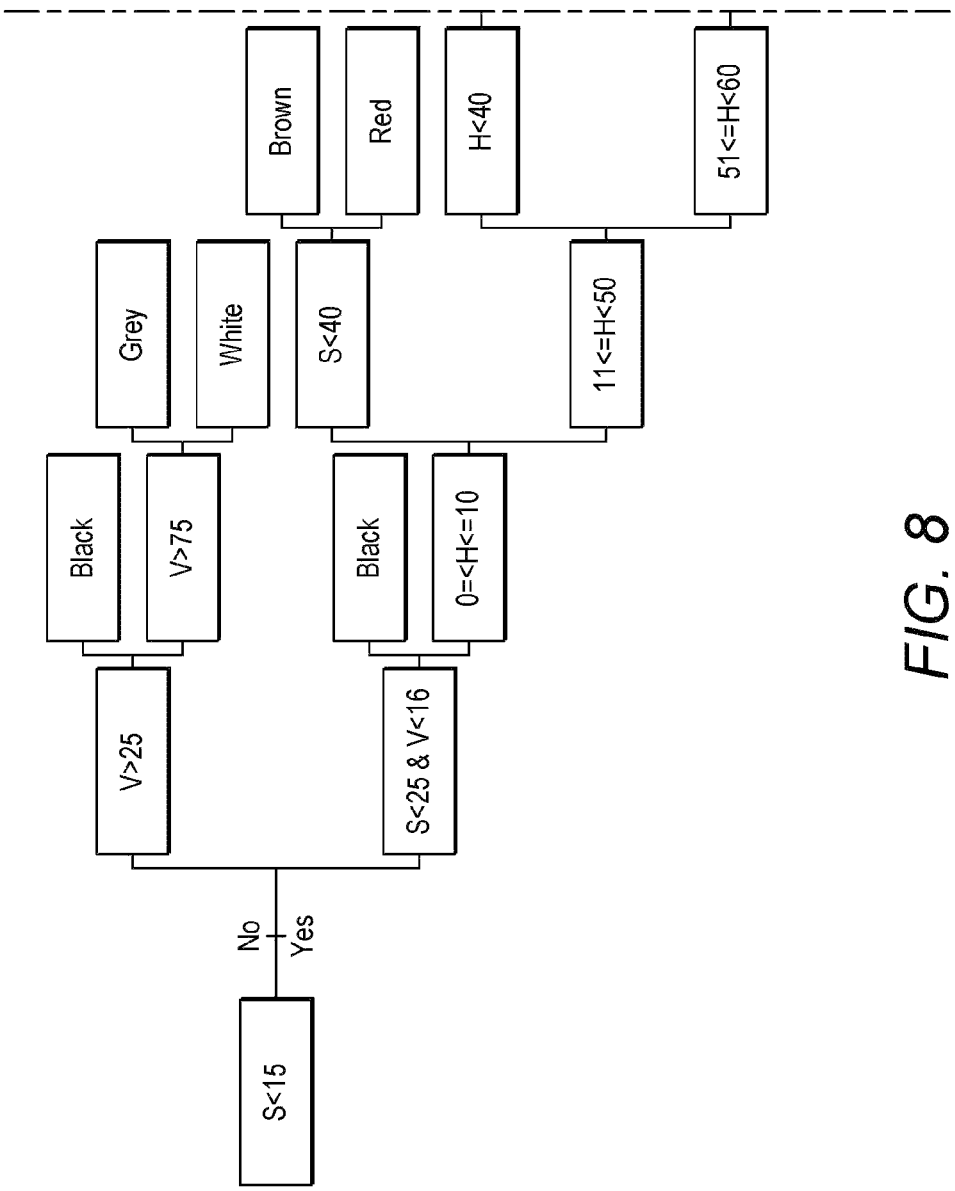
FIG. 8 shows a colour tree diagram according to an embodiment of the invention.
Figure 8:
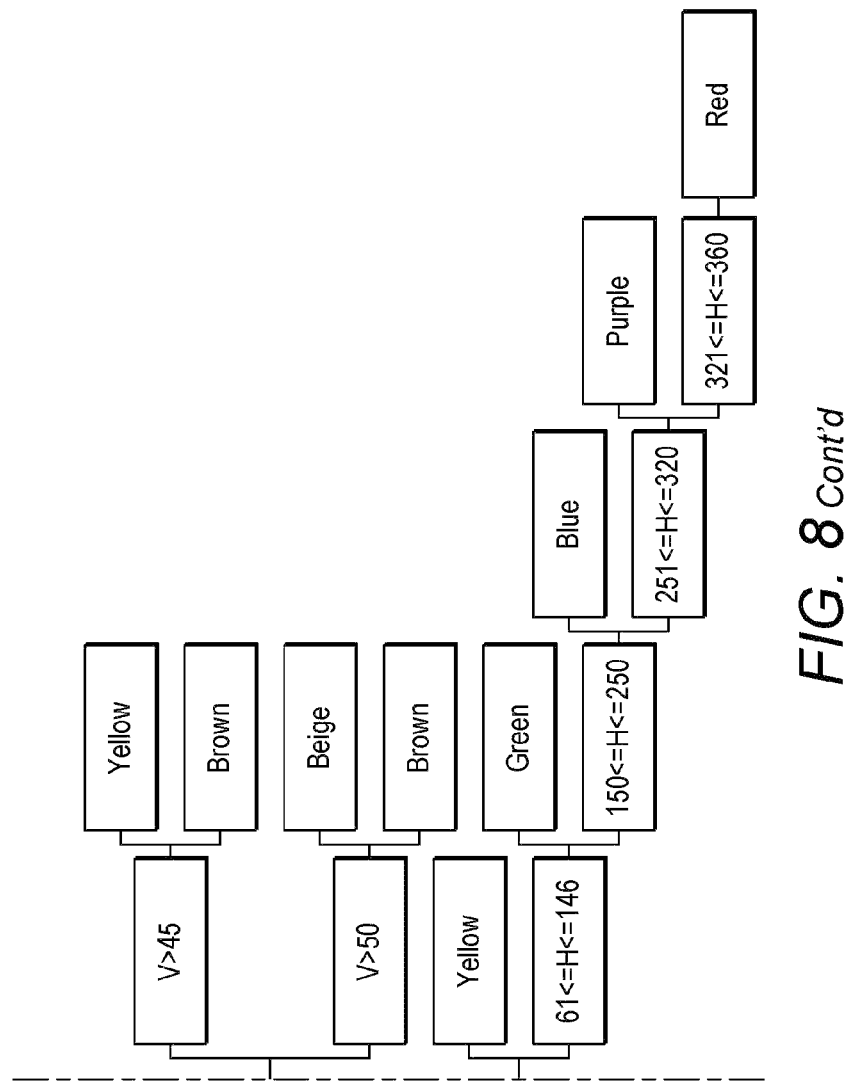

Using H, S, V values rather than R, G, B values for the tree algorithm such as that shown in FIG. 8 was found to be more robust compared to known colour determination algorithms.

A further optional step of applying K-means clustering to the RGB values associated with the portion of the image output from the grab cut process may be applied with k=5. Thus, the RGB values for the top 5 dominant colours may be determined. Selecting the top 5 dominant colours is particularly advantageous because test results showed that this was the optimum number of dominant colours which allows the algorithm to work most efficiently under test conditions. This is because a lower k means that outlier data is not correctly handled, such as a red bag with a black strap. Further a higher value of k does not correctly summarise the data and furthermore has been found too complicated for a machine learning algorithm to learn. However it will be appreciated that in some cases less or more than 5 dominant colours may be determined. For example, the top 3 or 10 dominant colours may also be determined.

The determined average colour value is then input into a rules-based colour assignment algorithm in order to assign a colour or classified the colour of the image according to a predetermined colour. The following code, as well as the colour tree diagram of FIG. 8 describe how the rule-based colour mapping is performed:

In this code:
    score, label, bounding_box=material_model.image_predict(image)
    grab_cut_image=grab_cut(image, bounding_box)
    mean_r, mean_g, mean_b=grab_cut_image.reshape(-1, 3).mean(axis=0)
    Hsv=Rgb_to_hsv(mean_r, mean_g, mean_b)
    color_clusters=kmeans(k=5, image)[clusters]
    features=[color_clusters, [mean_r, mean_g, mean_b], rule_color]
Type features:
    material_pred=material_retinanet.predict(img)
    type_pred=type_retinanet.predict(img)
    external_pred=external_retinanet.predict(img)
    features=[material_pred[labels], type_pred[labels], external_pred[labels]]

Brightness reduction:
    h, s, v=rgb_to_hsv(r, g, b)
    v=v−40
    r, g, b=hsv_to_rgb(h, s, v)

TABLE 10

Code defining the HSV to colour function. In this, the labels bk, gy, wt, bn, rd, yw, be, gn, bu, pu, rd are the colours black, grey, white, brown, red, yellow, beige, green, blue, purple and red respectively.

```
@staticmethod
def hsv_to_color(hsv):
    # rules of hsv to get colors from iata chart
    # h: 0 - 360
    # s: 0 - 100
    # v: 0 - 100
    hsv = (round(hsv[0] * 360), round(hsv[1] * 100), round(hsv[2] / (255/100)))
    if hsv[1] < 15:
        if hsv[2] < 25:
            final_color = "bk"
        elif hsv[2] < 75:
            final_color = "gy"
        else:
            final_color = "wt"
    elif hsv[1] < 25 and hsv[2] < 16:
        final_color = "bk"
    elif hsv[0] >= 0 and hsv[0] <= 10:
        if hsv[2] < 40:
            final_color = "bn"
        else:
            final_color = "rd"
    elif hsv[0] >= 11 and hsv[0] <= 50:
        if hsv[1] > 40:
            if hsv[2] > 45:
                final_color: = "yw" # orange
            else:
                final_color = "bn"
        else:
            if hsv[2] > 50:
                final_color = "be"
            else:
                final_color = "bn"
    elif hsv[0] >= 51 and hsv[0] <= 60:
        final_color = "yw"
    elif hsv[0] >= 61 and hsv[0] <= 149:
        final_color = "gn"
    elif hsv[0] >= 150 and hsv[0] <= 250:
        final_color = "bu"
    elif hsv[0] >= 251 and hsv[0] <= 320:
        final_color = "pu"
    elif hsv[0] >= 321 and hsv[0] <= 360:
        final_color = "rd"
    return final_color
```

As will be appreciated from the colour tree diagram of FIG. 8, the average colour is mapped to one of a predetermined colour categorisation defined by colour space values.

Referring to FIG. 8 of the drawings it will be appreciated that embodiments of the invention may first examine saturation, S, values, then examine S and V values, and then examine look at H values if needed.

Examining the values according to this order is particularly beneficial compared to examining first hue sample values, then saturation sample values and then the sample values.

By way of explanation, the S, Saturation values first indicate how grey an image is or in other words the lack of colour. So this is first used to filter to colours; black, grey and white if under a certain value.

The, V, Values then indicate brightness, say if black if under a certain value.

Finally, the H, Hue, values are then used to determine within which colour range or ranges a bag may be in and may again be checked with V if two colours are close in H values.

This is beneficial because in practice, light sources have a colour temperature that is not always constant. This means that any black, grey or white a hue value which may not be accurate. Accordingly, hue values are not checked until the algorithm has determined with enough certainty that that the bag is not a black, grey or white bag.

In the specific example of the HSV colour mapping shown in FIG. 8, a determination is first made as to whether the average S value is less than a first threshold=15. If the average S value is not less than 15, then the next step is to determine whether the average V value is greater than a second threshold=25. If the average value is not greater than 25, then the bag is categorised as black. Otherwise if the average value is greater than 25, then a determination is made as to whether the average V value is greater than a third threshold=75. If the average value is not greater than the third threshold, then the bag is categorised as grey, but if the average V value is greater than 75, then the bag is classified as white.

It will be appreciated that any predetermined bag colour may be mapped to any one of the colours shown in Table 9 in a similar manner.

Using such rule-based approach to define the target variable embodiments of the invention provide a systematic approach to defining colours. This solves the problem of inconsistent labelling of bag colours. For example, one person may label a bag as purple while another may consider that the same bag is in fact red.

This procedure may correctly categorise a bag colour according to a predetermined colour categorisation. However, a problem with this approach is that is uses average values. In the case of a bag having a dark strap around it, the average colour is distorted because of the strap or other dark portion within the bounding box.

Similarly, if a black bag has red strap around it, then the rules based approach may categorise the bag as red, because the average colour is used. However, the red colour only occur in low proportion in the portion of the image extracted by the grab cut function.

This problem may be solved by applying a K-means clustering function 617 to the RGB values associated with the portion of the image output from the grab cut process. K-means clustering is a well-known Open Source algorithm which will be known to the skilled person available at https://docs.opencv.org//3.0-beta/doc/py_tutorials/py_ml/py_kmeans/py_kmeans_opencv/py_kmeans_opencv.html which may be used with k=5, in order to obtain colour values, such as RGB values for the top 5 dominant colours in the portion of the image.

The dominant colour RGB values and the average colour RGB values are used as predictor values to train with using a machine learning algorithm. Thus, these are the features. The machine learning algorithm may be advantageously trained using a Random Forest Model 619. This has the benefit that it has easily configurable parameters to adjust for overfitting by tuning hyperparameters.

In other words, training allows embodiments of the invention to learn how to correctly classify most of the colours using information outside of a rules-based approach. Any outlier cases to the rules-based approach such as a black bag with red strap, are assumed to be a small minority of data points thus, which have little impact on the model's prediction. This allows for prediction closer to an item's true colour.

It will be appreciated that the random forest model 619 may be the machine learning algorithm used to predict the colour based on the average colour values associated with the portion of the image where the item is located. As shown in FIG. 6 of the drawings, usually the random forest model 619 receives information defining i) the k dominant colours and ii) the average colour associated with the portion of the image where the item is located as well as iii) the training data generated from a rules based colour assignment.

However, the random forest model 619 may predict the colour based on any one or more of the 3 inputs i), ii) or iii) above. This is because inputs or techniques i), ii) and iii) are different techniques to describe colour so theoretically should be complete enough to predict the colour. Combining these techniques provides an optimum colour determination algorithm or in other words provides a good balance for good indicators of colour and regularisation.

The model predict box shown in FIG. 6 indicates that the final output predicted colour output 621 will usually change depending on the training data set 615.

Embodiments of the colour categorisation process have the advantage that it has no human interaction, and avoids inconsistent colour categorisation.

Accordingly, it will be appreciated that by using a random forests model 619 to learn from the dominant colour features allows for correct classification of problematic images as previously described. The previously determined colour HSV values determined above become target values for machine learning.

Accordingly, it will be appreciated that colour categorisation may be performed using a rule-based algorithm and with both unsupervised and supervised machine learning.

The unsupervised approach to create the input data features and a rules-algorithm to generate the target variable for inputs into a machine learning algorithm to predict for future bag images.

Thus, a grab-cut function may be performed on all bag images. The bounding box required by grab-cut may be obtained by first training a RetinaNet model for just the bag bounding box and using the model bounding box output for the highest score of the bag.

For features embodiments of the invention use k-means clustering with k=5 as described above and use the RGB values for each cluster, we also take the average colour by taking the average value of all remaining RGB values. Thus, we obtain 3×5+3=18 features.

The target variable is created again by using grab-cut then taking the average RGB values and running these values into a manually created function which converts this to HSV and then makes an approximation for the colour as previously described.

As shown in FIG. 9 the results of the colour classification or categorisation may be output to a User Interface, at step 709. This may be advantageously used by an agent for improved retrieval of a lost bag.

Multicolour or Patterned Design Model

A model to detect for if a bag is not a solid colour but rather is a multicolour or patterned design may be provided in some embodiments. The may be achieved using the previously described bounding box of the bag to train with the labels of material, type and pattern to train for those models respectively.

The system 100 may interact with other airport systems in order to output the determined bag type or/and colour to other systems.

This may be performed by way of Web Services Description Language, WSDL, Simple Object Access Protocol (SOAP), or Extensible Mark-up Language, XML, or using a REST\JSON API call but other messaging protocols for exchanging structured information over a network will be known to the skilled person.

From the foregoing, it will be appreciated that the system, device and method may include a computing device, such as a desktop computer, a laptop computer, a tablet computer, a personal digital assistant, a mobile telephone, a smartphone. This may be advantageously used to capture an image of a bag at any location and may be communicatively coupled to a cloud web service hosting the algorithm.

The device may comprise a computer processor running one or more server processes for communicating with client devices. The server processes comprise computer readable program instructions for carrying out the operations of the present invention. The computer readable program instructions may be or source code or object code written in or in any combination of suitable programming languages including procedural programming languages such as C, object orientated programming languages such as C#, C++, Java, scripting languages, assembly languages, machine code instructions, instruction-set-architecture (ISA) instructions, and state-setting data.

The wired or wireless communication networks described above may be public, private, wired or wireless network. The communications network may include one or more of a local area network (LAN), a wide area network (WAN), the Internet, a mobile telephony communication system, or a satellite communication system. The communications network may comprise any suitable infrastructure, including copper cables, optical cables or fibres, routers, firewalls, switches, gateway computers and edge servers.

The system described above may comprise a Graphical User Interface. Embodiments of the invention may include an on-screen graphical user interface. The user interface may be provided, for example, in the form of a widget embedded in a web site, as an application for a device, or on a dedicated landing web page. Computer readable program instructions for implementing the graphical user interface may be downloaded to the client device from a computer readable storage medium via a network, for example, the Internet, a local area network (LAN), a wide area network (WAN) and/or a wireless network. The instructions may be stored in a computer readable storage medium within the client device.

As will be appreciated by one of skill in the art, the invention described herein may be embodied in whole or in part as a method, a data processing system, or a computer program product including computer readable instructions. Accordingly, the invention may take the form of an entirely hardware embodiment or an embodiment combining software, hardware and any other suitable approach or apparatus.

The computer readable program instructions may be stored on a non-transitory, tangible computer readable medium. The computer readable storage medium may include one or more of an electronic storage device, a magnetic storage device, an optical storage device, an electromagnetic storage device, a semiconductor storage device, a portable computer disk, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk.

Exemplary embodiments of the invention may be implemented as a circuit board which may include a CPU, a bus, RAM, flash memory, one or more ports for operation of connected I/O apparatus such as printers, display, keypads, sensors and cameras, ROM, a communications sub-system such as a modem, and communications media.

The following examples are hereby included to provide further description of the invention.

1. An item classification system for use in an item handling system, the classification system comprising:
   a. processing means configured to:
      i. process an image of an item to determine, based on a first model (101), one or more predetermined first item types, each first item type defined by one or more first item characteristics;
      ii. process the image to determine, based on the first model (101), a first probability associated with each first item type wherein each first probability is indicative of the likelihood that the item has the first characteristics defining each determined first item type;
      iii. process the image to determine, based on a second model (103), one or more predetermined second item types, each second item type defined by one or more second item characteristics;
      iv. process the image to determine, based on the second model (103), a second probability associated with each second item type wherein each second probability is indicative of the likelihood that the item has the second characteristics defining each second item type; and
      v. classifying the item according to each first item type and each second item type and the probability associated with each first item type and the probability associated with each second item type.

2. The system of clause 1 wherein the processing means is further configured to:
   i. process the image to determine, based on a third model (105), one or more predetermined third item types, each third item type defined by one or more third item characteristics;
   ii. process the image to determine, based on the third model (105), a third probability associated with each third item type wherein each third probability is indicative of the likelihood that the item has the third characteristics defining each third item type; and
   iii. further classify the item according to each third item type and the probability associated with each third item type.

3. The system according to any preceding clause wherein the processing means is further configured to;
   i. output each determined first item type and the probability associated with each determined first item type to a fourth model (107);
   ii. output each determined second item type and the probability associated with each determined second item type to the fourth model (107);
   iii. preferably output each determined third item type and the probability associated with each determined third item type to the fourth model (107);
   iv. classify, based on the fourth model, the item according to common characteristics of the types determined by the first, second and preferably the third model.

4. The system according to any preceding clause wherein the processing means is further configured to:
   i. determine one or more first labels associated with each first item type;
   ii. determine one or more second labels associated with each second item type; and
   iii. determine one or more third labels associated with each third item type.

5. The system according to any preceding clause wherein the first model is different from the second model and wherein the second model is different from the third model and wherein the third model is different from the first model.

6. The system according to any preceding clause wherein the items comprise baggage.

7. The system according to any preceding clause wherein the item handling system is a baggage handling system at an airport.

8. The system according to any preceding clause wherein each first label or item type is associated with a different type of baggage.

9. The system according to any preceding clause wherein each second label or item type is associated with different external characteristic of baggage.

10. The system according to any preceding clause wherein each third label or item type is associated with a different characteristic material of baggage.

11. The system of any preceding clause wherein the first model (101) is trained with the or a first label and a plurality of item training images and wherein the second model (103) is trained using the or a second label and the plurality of item training images and preferably wherein the third model (105) is trained using the or a third label and the plurality of item training images, and further preferably wherein the first label is different from the second label and more preferably wherein each of the first label and second label is different from the third label.

12. The system of any preceding clause wherein the item is classified using a single image.

13. The system of any preceding clause further comprising determining a first zone from the received image wherein the first zone defines a sub region of the received image which encloses the item and wherein the first zone is associated with a first set of sample values.

14. An item handling system comprising the classification system of any preceding clause wherein the item handling system is arranged to process the item according to the determined item type.

15. The item handling system comprising the classification system of any preceding clause wherein the item handling system comprises image capture means (109) and/or a conveyor means wherein the item is classified in response to the image capture means and/or the conveyor means detecting the presence of the item.

16. The item handling system of clauses 13 or 14 further comprising searching a data base or storage means for an item having characteristics corresponding to the determined classification of the item.

17. The item handling system of clause 15 further comprising searching a database for items having associated location data and data defining a time when the item was detected at a particular location.

18. An image processing system for categorising the colour of an item, the system comprising:
  processing means configured to:
  i. process an image of an item to extract a portion of the image where the item is located;
  ii. determine a plurality of average colour values associated with the portion of the image wherein the colour values are associated with a colour space;
  iii. mapping the plurality of average colour values to one of a plurality of predetermined colour definitions based on a plurality of colour ranges associated with each colour definition.

19. The system of clause 18 wherein the processing means is further configured to determine a plurality of dominant colours associated with the portion of the image.

20. The system of clause 18 or 19 wherein the processing means is further configured to categorise the colour of the item using a further model 619 based on the determined average colour and the dominant colours associated with the image.

21. A method for executing the system of any preceding clause.

22. A computer program product which when executed undertakes the method of clause 21.

23. An image processing system for categorising the colour of an item, the system comprising:
  processing means configured to:
  i. process an image of an item to extract a portion of the image where the item is located;
  ii. determine a first average colour value of a plurality of colour values associated with the portion of the image where the item is located;
  iii. mapping the average colour value to one of a plurality of predetermined colour definitions based on a plurality of colour ranges associated with each colour definition; and
  iv. categorising the colour of the item according to the mapping.

24. The system of clause 23 wherein the first average colour value is determined according to a first colour space and wherein the processing means is further configured to determine a second average colour value according to a second colour space wherein the first colour space is different from the second colour space.

25. The system of clause 24 wherein the processing means is further configured to determine a single average colour for the plurality of channels defining the first colour space and preferably to determine a plurality of average colours for each of the plurality of channels defining the second colour space.

26. The system of clause 24 or 25 wherein the first colour space is a red, green, blue colour space and preferably wherein the second colour space is a hue, saturation and value colour space.

27. The system of any preceding clause wherein the processing means is further configured to determine a plurality of dominant colours associated with the portion of the image and preferably to determine colour values for each of the plurality of dominant colours and further preferably wherein each dominant colour is determined using k-means clustering.

28. The system of any preceding clause wherein the processing means is further configured to categorise the colour of the item using a model (619) based on the determined average colour value or/and the dominant colours associated with the image.

29. The system of claim 28 further comprising training the model (619) using the determined dominant colour values or/and the average colour values and preferably wherein the model is a random forest model (619).

30. The system of any preceding clause wherein the processing means is further configured to generate training data using the image of the item wherein the training data comprises any one or more of:
  a. the or an image of the item;
  b. the or an associated colour classification of the item;
  c. the or an average colour values of the item; and
  d. the or further dominant colour values of the item.

31. The system of clause 30 wherein the average colour values and the dominant colour values are determined from an extracted portion of the image where the item is located.

32. A baggage handling system comprising the image processing system of clause 23 wherein the item is an item of baggage for check in at an airport.

33. The baggage handling system of any preceding clause wherein the system is configured to categorise the colour of the item in response to a passenger or agent placing the item of baggage on a bag drop belt.

34. The baggage handling system of any preceding clause wherein the processing means is further configured to determine a bounding box enclosing at least a portion of the bag within the image.

35. The baggage handling system of any preceding clause wherein the processing means is further configured to extract a portion of the image containing the bag using a grab cut function.

36. An image processing system for categorising the colour of an item, the system comprising:
  processing means configured to:
  i. process an image of an item to extract a portion of the image where the item is located;
  ii. determine a first average colour value of a plurality of colour values associated with the portion of the image where the item is located;
  iii. determine a plurality of dominant colour values associated with the portion of the image where the item is located; and
  iv. categorising the colour of the item according to the first average colour value and the plurality of dominant colour values.

37. A method for executing the system of any preceding clause and preferably a computer program product which when executed undertakes the method.

The invention claimed is:

1. An image processing system for categorising a colour of an item, the system comprising:
  a memory; and
  a computer processor coupled to the memory, the computer processor being configured to:
  i. process an image of an item to extract a portion of the image where the item is located;
  ii. determine a first average colour value of a plurality of colour values associated with the portion of the image where the item is located according to a first colour space;
  iii. determine a second average colour value according to a second colour space, wherein the first colour space is different from the second colour space;
  iv. map the first average colour value to one of a plurality of predetermined colour definitions based on a plurality of colour ranges associated with each colour definition; and
  v. categorising the colour of the item according to the mapping.

2. The system of claim 1 wherein the computer processor is further configured to determine a single average colour for the plurality of channels defining the second colour space.

3. The system of claim 2, wherein the computer processor is further configured to determine a plurality of average colours for each of the plurality of channels defining the first colour space.

4. The system of claim 1 wherein the second colour space is a red, green, blue colour space.

5. The system of claim 4 wherein the first colour space is a hue, saturation and value colour space.

6. The system of claim 1, wherein the computer processor is further configured to determine a plurality of dominant colours associated with the portion of the image.

7. The system of claim 6, wherein the computer processor is further configured to determine colour values for each of the plurality of dominant colours.

8. The system of claim 6, wherein each dominant colour is determined using k-means clustering.

9. The system of claim 1, wherein the computer processor is further configured to categorise the colour of the item using a model based on at least one of the determined average colour value and dominant colours associated with the image.

10. The system of claim 9 further comprising training the model (619) using the determined dominant colour values or/and the average colour values.

11. The system of claim 10, wherein the model is a random forest model.

12. The system of claim 1, wherein the computer processor is further configured to generate training data using the image of the item wherein the training data comprises any one or more of:
  a. the image of the item;
  b. an associated colour classification of the item;
  c. the average colour values of the item; and
  d. further dominant colour values of the item.

13. The system of claim 12 wherein the average colour values and the dominant colour values are determined from an extracted portion of the image where the item is located.

14. The system of claim 1, wherein the item is an item of baggage for check in at an airport.

15. The system of claim 1, wherein the system is configured to categorise the colour of the item in response to a passenger or agent placing the item of baggage on a bag drop belt.

16. The system of claim 1, wherein the computer processor is further configured to determine a bounding box enclosing at least a portion of a bag within the image.

17. The system of claim 1, wherein the computer processor is further configured to extract a portion of the image containing a bag using a grab cut function.

18. The system of claim 1, wherein the computer processor is further configured to map the second average colour value to another one of the plurality of predetermined colour definitions based on the plurality of colour ranges associated with each colour definition.

19. An image processing system for categorising a colour of an item, the system comprising:
  processing means configured to:
  i. Process an image of an item to extract a portion of the image where the item is located;
  ii. determine a first average colour value of a plurality of colour values associated with the portion of the image where the item is located according to a first colour space;
  iii. determine a second average colour value according to a second colour space, wherein the first colour space is different from the second colour space;
  iv. determine a plurality of dominant colour values associated with the portion of the image where the item is located; and
  v. categorize the colour of the item according to the first average colour value and the plurality of dominant colour values.

20. An image processing method for categorising a colour of an item, the method comprising the steps of:
  i. processing an image of an item to extract a portion of the image where the item is located;

ii. determining a first average colour value of a plurality of colour values associated with the portion of the image where the item is located according to a first colour space;
iii. determining a second average colour value according to a second colour space, wherein the first colour space is different from the second colour space;
iv. mapping the average colour value to one of a plurality of predetermined colour definitions based on a plurality of colour ranges associated with each colour definition; and
v. categorising the colour of the item according to the mapping.

* * * * *